United States Patent [19]

Iijima

[11] 4,115,671
[45] Sep. 19, 1978

[54] CONTROL SYSTEM FOR AN AUTOMATIC TRANSMISSION INCLUDING SWITCH WITH LOST MOTION ACTUATOR

[75] Inventor: Tetsuya Iijima, Tokyo, Japan

[73] Assignee: Nissan Motor Company, Limited, Yokohama, Japan

[21] Appl. No.: 753,792

[22] Filed: Dec. 23, 1976

[30] Foreign Application Priority Data

Dec. 27, 1975 [JP] Japan ................................. 50/157067

[51] Int. Cl.² .......................... H01H 3/16; B60K 21/00
[52] U.S. Cl. .................................... 200/61.91; 74/866; 200/61.89; 200/67 E; 200/153 V
[58] Field of Search ................. 200/61.89, 61.9, 61.91, 200/153 V, 67 E; 307/116; 74/865, 866, 872, 877

[56] References Cited

U.S. PATENT DOCUMENTS

| | | | |
|---|---|---|---|
| 2,276,378 | 3/1942 | Duguay | 200/153 V X |
| 3,258,549 | 6/1966 | Stoi | 200/153 V |
| 3,707,097 | 12/1972 | Arai et al. | 307/116 X |
| 3,757,133 | 9/1973 | Arai et al. | 335/206 X |
| 3,766,342 | 10/1973 | Stadelmann | 200/153 V X |

*Primary Examiner*—James R. Scott
*Attorney, Agent, or Firm*—Bacon & Thomas

[57] ABSTRACT

A snap-action switch operated by movements of the accelerator pedal is interposed between a D.C. source and a downshift circuit actuator of the automatic power transmission in a manner that once the switch closes by nearly full depression of the accelerator pedal, the switch remains closed unitl the accelerator pedal is permitted to return to or beyond a partially depressed position corresponding to about ½ open position of the throttle valve. The saving of fuel is accomplished by the "lost motion" existant between the boss portion of the rod and the respective projection surfaces engaged by the boss portion in the acceleration and deceleration phases of operation.

5 Claims, 8 Drawing Figures

CONTROL SYSTEM FOR AN AUTOMATIC TRANSMISSION INCLUDING SWITCH WITH LOST MOTION ACTUATOR

FIELD OF THE INVENTION

The present invention relates in general to an automatic power transmission system and more particularly to a control system which shifts the transmission down to the next lower vehicle speed gear ratio when the accelerator pedal is depressed to its full extent. More specifically, the present invention is concerned with such control system by which the downshaft condition is continued for a certain period of time even when the accelerator pedal is released from its fully depressed position.

BACKGROUND OF THE INVENTION

It is known that some of the conventional power transmissions are arranged in a manner that downshift during a relatively high vehicle speed is achieved only when the accelerator pedal is continuously depressed to its full extent. However, in this case, the following drawbacks will inevitably arise: since the downshift is established by the continuous full depression of the accelerator pedal, it will induce wasteful fuel consumption of the engine. Furthermore, if the accelerator pedal is abruptly released from its fully depressed position, upshift takes place suddenly. This is very undesirable in case rapid acceleration of the vehicle is required.

SUMMARY OF THE INVENTION

Therefore, the present invention is proposed to eliminate such drawbacks encountered in the abovementioned conventional automatic transmission of a vehicle.

It is an object of the present invention to provide a control system for an automatic power transmission which maintains the transmission in the downshift condition until the accelerator pedal is permitted to return to or beyond a partially depressed position corresponding to about ½ open position of the throttle valve.

It is another object of the present invention to provide a control system for an automatic power transmission of a vehicle driven by an engine the output of which is controlled by the opening degree of a throttle valve operatively connected to the accelerator pedal, the transmission having a downshift circuit for providing a shift down operation when energized and providing a shift up operation when deenergized, the control system comprising: a snap-action switch having first and second states thereof which alternately take place in a snap-action manner, the first state being a state in which the switch closes to energize the downshift circuit and the second state being a state in which the switch opens to deenergize the downshift circuit; and actuating means for permitting the snap-action switch to take the first state when the accelerator pedal is depressed beyond a relatively long predetermined distance corresponding to a first predetermined position of the throttle valve and to take the second state when the accelerator pedal is permited to return to a partially depressed position corresponding to a second predetermined position of the throttle valve, the opening degree of the throttle valve at the first predetermined position being greater than that of the second predetermined position.

Other objects and advantages of the present invention will become more apparent from the following detailed description when taken in conjunction with the accompanied drawings.

DESCRIPTION OF THE PREFERRED EMBODIMENT

Figure 1:
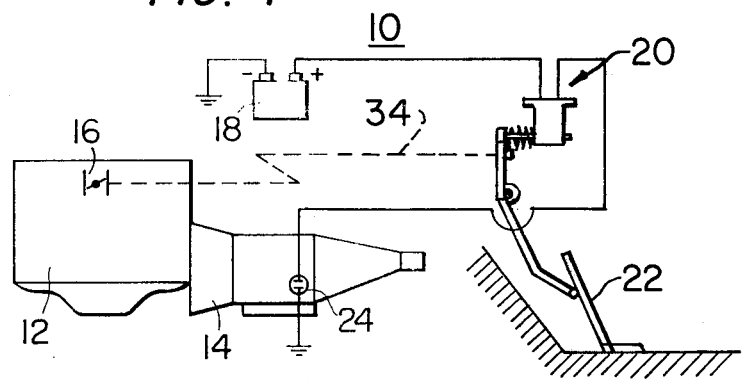
FIG. 1 is a schematic circuit diagram of a control system connected to an automatic power transmission of a vehicle according to the present invention.

Referring to FIG. 1 of the drawings, a control system 10 for an automatic power transmission is shown as communicating with an internal combustion engine 12 and an automatic power transmission 14 of known construction. The engine 12 has therein conventional means producing a throttle pressure the magnitude of which is substantially proportional to the output of the engine 12. Usually, the means communicates with a throttle valve 16 of the engine 12 so as to produce the throttle pressure the magnitude of which is substantially proportional to the opening degree of the throttle valve 16. Thus, the throttle pressure is maximum when the throttle valve 16 is fully open and minimum when the valve 16 is only slightly open. The automatic power transmission 14 includes therein a conventional downshift circuit (not shown) into which a hydraulic fluid from a source of fluid under pressure is introducible to move shifting points, at which the transmission shifts to another vehicle speed gear ratio, toward the higher vehicle speed.

The control system 10 generally comprises a D.C. source 18 and a position holding means 20 actuated by an accelerator pedal 22, and a downshift circuit actuator 24. The downshift circuit actuator 24 functions to open the fluid communication between the before-mentioned source of fluid and the before-mentioned downshift circuit, thus establishing the above-mentioned shift points moving, when electrically energized.

Figure 2:
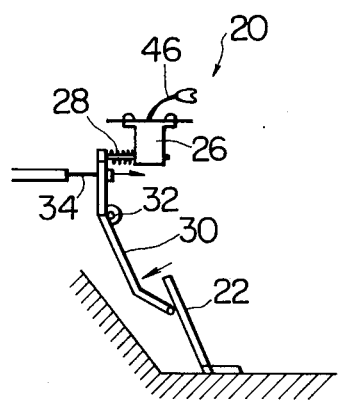
FIG. 2 is a schematic view of position holding means used in the control system of the present invention.

FIG. 2 shows clearly the positional relation between the position holding means 20 and the accelerator pedal 22. The position holding means 20 generally comprises a snap-action switch 26 electrically connected to the downshift circuit actuator 24, a rod 28 for operating the snap-action switch 26 by the axial movements thereof, and an arm 30 for transferring the movements of the accelerator pedal 22 to the rod 28 in a proportional manner. A support member 32 is for the pivotal movements of the arm 30, so that the depression of the accelerator pedal 22 urges the arm 30 against the operating rod 28. Designated by the numeral 34 is a wire which connects the arm 30 with the throttle valve 16 so that the depression of the accelerator pedal 22 induces opening operation of the throttle valve 16.

Figure 3:
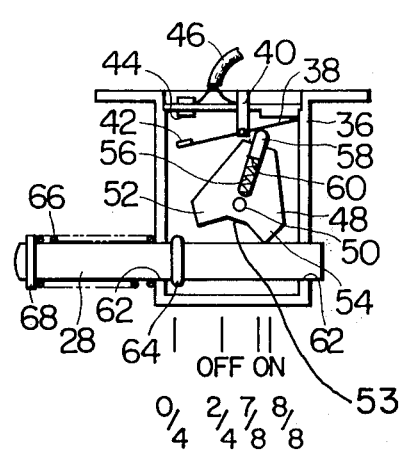
FIG. 3 is an enlarged sectional detailed view of a main part of the position holding means shown in FIG. 2.

FIG. 3 shows the detailed construction of the snap-action switch 26 and the rod 28 which are combined. The snap-action switch 26 comprises a housing 36 which is fixed to a stationary body portion of the vehicle. A lever member 38 is rotatably supported at its middle portion by a support member 40 fixed to an upper portion of the housing 36. The lever member 38 and the support member 40 are made of some electrically conductive material. A movable contact 42 is fixed to one end portion of the lever member 38 and a stationary contact 44 is fixed to a part of the housing 36 at a position contactable with the movable contact upon clockwise rotation of the lever member 38. The support member 40 and the stationary contact 44 are respectively connected to the D.C. source 18 and the downshift circuit actuator 24 through lead lines 46. In order to facilitate the following explanation on the construction of the snap-action switch 26, a state in which the lever member 38 is tilted in a direction to engage the movable contact 42 with the stationary contact 44 will be called a first state, and another state in which the lever member 38 is tilted in an opposite direction to disengage the movable contact 42 from the stationary contact 44 will be called a second state. Thus, the lever member 38 now shown in the drawing takes the second state.

Located below the lever member 38 is a generally triangular plate 48 which is swingably rotated about a pin 50 as shown. The plate 48 has outwardly extending first and second projections 52 and 54 at both ends of the base side thereof and has an elongate slot 56 extending from the generally central portion thereof to the apex opposite the base side. The positional relation between the lever member 38 and the triangular plate 48 is such that when the plate 48 is in the neutral position thereof, the apex opposite to the base side is positioned in an imaginary line passing through the supported portions or pivot axes of the lever member 38 and the plate 48.

Slidably disposed into the elongate slot 56 is a dog member 58 which is urged outwardly by a compression spring 60 disposed between the bottom of the elongate slot 56 and the rear end of the dog member 58, as shown. With this, it will be appreciated that the before-mentioned first and second states of the lever member 38 alternatively take place in a snap-action manner in response to the swinging movement of the triangular plate 48. More specifically, when the triangular plate 48 is tilted leftward or counterclockwise in the drawing, the first state of the lever member 38 takes place, on the contrary, when the plate 48 is tilted rightward or clockwise, the second state of the lever member 38 takes place.

The rod 28 is slidably disposed in through holes 62 formed at lower portions of the housing 36 so that a part thereof positioned in the housing 36 is located under the triangular plate 48. As shown, the actuating rod 28 is provided at the part thereof with a radially outwardly projecting portion or boss portion 64 which is selectively engageable with the first and second projections 52 and 54 of the triangular plate 48. Now, it should be noted that the setting of the rod 28 to the housing 36 is so made that when the triangular plate 48 is tilted rightward causing the before-mentioned second state of the lever member 38, the boss portion 64 is positioned in the leftmost position as shown in the drawing.

A helical spring 66 is disposed about the rod 28 between a spring seat 68 fixed to the head portion of the rod 28 and the housing 36 so as to urge the rod 28 to move leftward in this drawing. Accordingly, the rod 28 remains in the leftmost position thereof in the drawing as long as the accelerator pedal 22 is not depressed, and the rod 28 is gradually moved rightward in accordance with the depression degree of the accelerator pedal 22. Thus, it will be noted that when the rod 28 is moved rightward beyond a certain distance, the triangular plate 48 snaps to the other position by the urging action of the boss portion 64 against the second projection 54 of the plate 48. Thus, the first state of the lever member 38 takes place. Now, is should be noted that once the triangular plate 48 is tilted counterclockwise, the plate 48 remains in this position until the boss portion 64 abuts or strikes the first projection 52 of the plate 48 to urge the plate 48 clockwise in accordance with the leftward movement of the rod 28. Accordingly, the space 53 formed between the first and second projections 52 and 54 of the triangular plate 48 permits the boss 64 to travel a predetermined distance before urgingly abutting the first and second projections to initiate a switching operation and therefore provides a so-called "lost motion" characteristics to the switch 26.

According to the present invention, the following relationship is established between the throttle valve 16 and the snap-action switch 26, that is, the first state of the lever member 38 causing the energization of the downshift circuit actuator 24 is initiated as the accelerator pedal 22 is depressed beyond a relatively long predetermined distance corresponding to 7/8 open position of the throttle valve 16, and the second state of the lever member 38 causing the deenergization of the actuator 24 takes place when the accelerator pedal 22 is permitted to return to a partially depressed position corresponding to ½ open position of the throttle valve 16. Of course, the mutual relationship between the throttle valve 16 and the snap-action switch 26 is more freely selected besides the above-mentioned one.

With the above, the operation of the control system 10 is as follows:

In order to facilitate the explanation of the operation, the following description will be made by the aid of FIGS. 3A to 3C. When the vehicle driver wishes downshift of the transmission 14 during a relatively high speed vehicle driving, he strongly depresses the accelerator pedal 22 to its full extent so as to exceed the position corresponding to 7/8 open position of the throttle valve. With this operation, the rod 28 is shifted from a position shown in FIG. 3A into the rightmost position shown in FIG. 3B causing the triangular plate 48 to tilt counterclockwise with a result that the lever member 38 takes the first state thereof as shown in FIG. 3B. Thus, in this state, the electrical connection between the D.C. source 18 and the downshift circuit actuator 24 is established to achieve downshift of the transmission. Now, it should be noted that the electrical connection between the D.C. source 18 and the downshift circuit actuator 24 is not broken even if some slight movement of the accelerator pedal 22 from its fully depressed position occurs. More specifically, the electrical connection is not broken unless the accelerator pedal 22 is permitted to return to or beyond the partially depressed position corresponding to ½ open position of the throttle valve 16 for the reason previously explained. This will be well understood from reference to FIG. 3C.

Figure 3A:
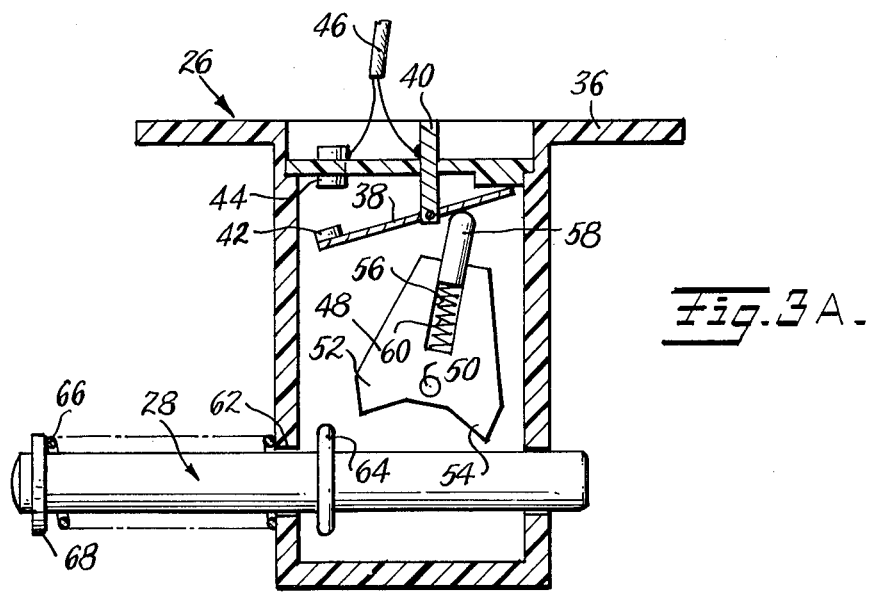
FIGS. 3A to 3C are views of the main part of the position holding means, but show various conditions of the main part, respectively.
Figure 3B:
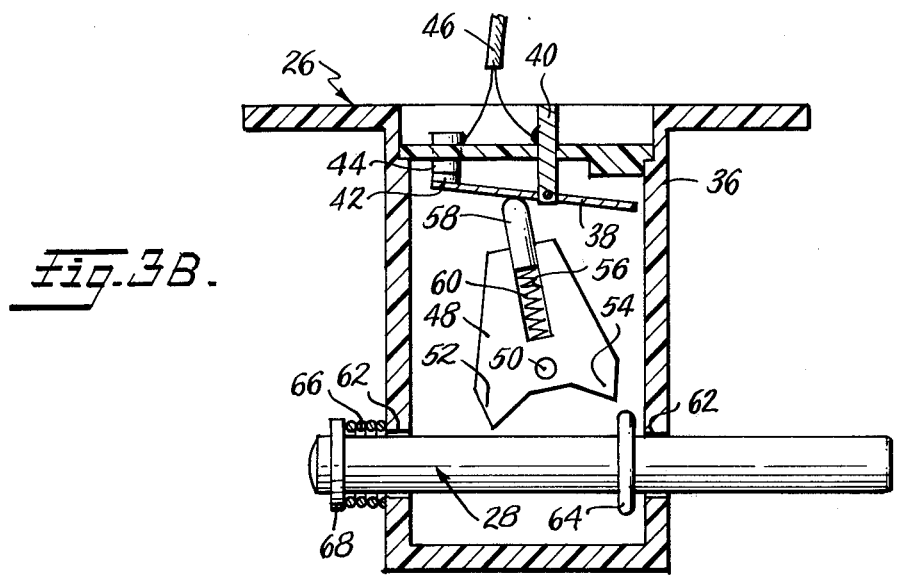
Figure 3C:
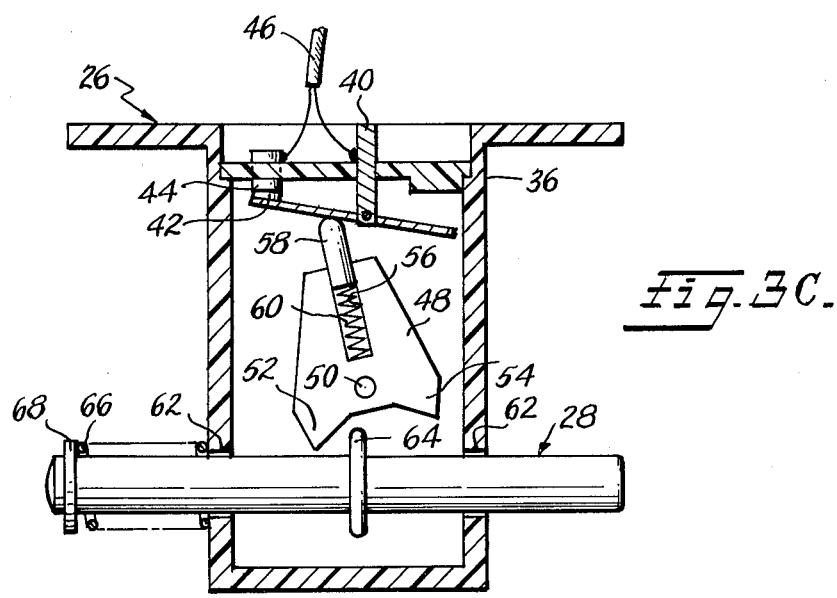

When the rod 28 returns beyond the position corresponding to ½ open position of the throttle valve 16 in response to return movement of the accelerator pedal 22 toward the idle position, the lever member 38 takes the second state shown in FIG. 3A so that the electric connection is again blocked, thus causing the upshift of the transmission. In addition to this, when the vehicle driver wishes to accelerate the vehicle without kickdown operation, he gently depresses the accelerator pedal 22. Under this movement, the lever member 38 does not shift to the first state even when the rod 28 is moved into the rightmost position. This is because of the absence of considerable inertia force applied to the second projection 54 of the plate 48 by the rod.

Figure 4:
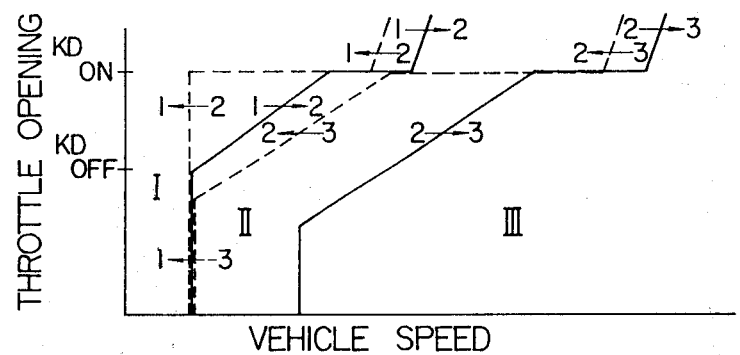
FIG. 4 is an illustration showing downshift and upshift characteristics of the automatic power transmission in case the position holding operation is not given by the position holding means, the illustration being plotted of the vehicle speed against the throttle opening.

FIG. 4 shows upshift and downshift characteristics of the transmission 14 equipped with the control system 10 of the invention in a case that the accelerator pedal 22 is moved from its dormant or idling position in a direction to open the throttle valve 16. First, second and third gear ratios of the transmission 14 are respectively represented by the letters I, II and III. The solid lines represent respective shifting points in case of upshifts, while the broken lines represent the shifting points in case of downshifts. The zone represented by KD-OFF (kickdown off) is a zone in which the lever member 38 takes the second state representing an "off" condition of the snap-action switch 26, and the zone positioned above a line represented by KD-ON (Kickdown on) is a zone in which the lever member 38 takes the first state representing an "on" condition of the snap-action switch 26 due to nearly full depression of the accelerator pedal 22. In this zone, the shifting points of the transmission 14 are positioned at the higher vehicle speed side, as shown.

Figure 5:
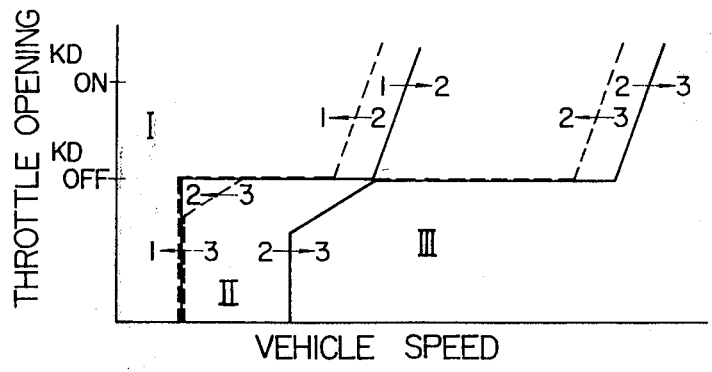
FIG. 5 is an illustration showing downshift and upshift characteristics of the automatic power transmission in case that the position holding operation is given by the position holding means.

FIG. 5 shows upshift and downshift characteristics of the transmission 14 with the control system 10 of the invention in a case where the lever member 38 takes the first state by the kickdown operation of the accelerator pedal 22. The zone represented by the point KD-ON is a zone in which the lever member 38 remains in the first state by the "lost motion" operation of the snap-action switch 26. Accordingly, in this zone, the shifting points are still set at the higher vehicle speed side, as shown.

With the above-stated construction of the control system of the present invention, the following several advantages and effects will be achieved.

(1) Since downshifting can be continued even when the accelerator pedal is somewhat returned from its nearly fully depressed position, the vehicle driver can accelerate the vehicle more sportily or easily by adjusting the depression of the accelerator pedal.

(2) Since downshifting can be continuously achieved even when continuous depression of the acclerator pedal is not provided, the acceleration of the vehicle in the lower vehicle speed gear ratio can be made with a small fuel consumption.

(3) Even if slight movements of the accelerator pedal from its nearly fully depressed position occur, the first state of the lever member causing the energization of the downshift circuit actuator is held. Thus, the unwanted sudden upshifting of the transmission is not induced.

(4) Since the control system of the subject invention can be made only by adding an improved switch to the conventional automatic power transmission, it can be constructed economically.

It should be noted that the foregoing description shows only an exemplary embodiment. Various modifications are apparent to those skilled in the art without departing from the scope of the present invention which is only limited by the appended claims.

What is claimed is:

1. A control system for an automatic power transmission of a vehicle driven by an engine the output of which is controlled by the opening degree of a throttle valve operatively connected to the accelerator pedal, said transmission having a downshift circuit for providing a shift-down operation when energized and for further providing a shift-up operation when deenergized, said control system comprising:

a snap-action switch having first and second states thereof which alternately take place in a snap-action manner, said first state being a state in which said switch closes to energize said downshift circuit and said second state being a state in which said switch opens to deenergize said downshift circuit; and actuating means for permitting said snap-action switch to take said first state when said accelerator pedal is depressed beyond a relatively long predetermined distance corresponding to a first predetermined position of said throttle valve and to take said second state when said accelerator pedal is permitted to return to a partially depressed position corresponding to a second predetermined position of said throttle valve, the opening degree of said throttle valve at said first predetermined position being greater than that of the second predetermined position.

2. A control system as claimed in claim 1, in which said actuating means comprises:

an operating rod axially slidably mounted in a housing of said snap-action switch in a manner that axial movement in one direction beyond a predetermined distance induces said first state of said snap-action switch and axial movement in the reverse direction beyond a predetermined distance induces said second state of said snap-action switch; and a transmission arm operatively connecting said accelerator pedal with said operating rod so that the depression of said accelerator pedal urges said transmission arm against said operating rod to urge the same in said one direction.

3. A control system as claimed in claim 2, in which said operating rod is provided at a part thereof positioned in said housing of sand snap-action switch with a boss portion which is engageable with parts of said snap-action switch to induce alternately said first and second states of said snap-action switch.

4. A control system as claimed in claim 3, in which said first predetermined position is 7/8 open position of said throttle valve and said second predetermined position is ½ open position of said throttle valve.

5. A control system for an automatic power transmission of a vehicle driven by an engine the output of which is controlled by the opening degree of a throttle valve operatively connected to the accelerator pedal, said transmission having a downshift circuit for providing a shift-down operation when energized and for further providing a shift-up operation when deenergized, said control system comprising:

a snap-action switch including a housing fixed to a stationary body portion of said vehicle, a lever member rotatably supported at its generally middle portion by a support member fixed to said housing so that said lever member is swingable in first and second directions, a movable contact fixed to one end portion of said lever member, a stationary contact fixed to said housing at a position contactable with said movable contact upon the rotation in said first direction, a generally triangular plate having first and second outwardly extending projections at both sides of the base thereof and having an elongated slot extending from the generally central portion thereof to the apex opposite said base, said plate being rotatably supported by a pin fixed to said housing in such a manner that when said plate is in the neutral position thereof, the apex is positioned in an imaginary line passing through the pivot axes of said lever member and said plate, a dog member slidably disposed in said elongated slot of said plate, and a compression spring disposed between the bottom of said elongated slot and the rear end of said dog member to urge said dog member in a direction to slidably contact with said lever member;

an operating rod slidably disposed in throughholes formed at lower portions of said housing so that a part thereof positioned in the housing is located under said triangular plate, said operating rod being provided with a boss portion which is selectively engageable with said first and second projections of said triangular plate; and a transmission arm operatively connecting said accelerator pedal with said operating rod so that the depression of said accelerator pedal urges the transmission arm against said operating rod to urge the same.

* * * * *